(12) United States Patent
Schnell et al.

(10) Patent No.: US 6,467,920 B2
(45) Date of Patent: *Oct. 22, 2002

(54) MIRROR ACTUATOR ELECTRICAL CONNECTOR

(75) Inventors: Robert E. Schnell; David K. Willmore, both of Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/812,434

(22) Filed: Mar. 20, 2001

(65) Prior Publication Data

US 2001/0010601 A1 Aug. 2, 2001

Related U.S. Application Data

(63) Continuation of application No. 09/228,348, filed on Jan. 11, 1999, now Pat. No. 6,213,612.

(51) Int. Cl.$^7$ .............................................. G02B 7/182
(52) U.S. Cl. ...................................... 359/877; 439/352
(58) Field of Search ................................ 359/872, 877; 439/350, 352

(56) References Cited

U.S. PATENT DOCUMENTS

| | | | |
|---|---|---|---|
| 4,403,829 A | 9/1983 | Thujiuchi et al. | |
| 4,449,776 A | * 5/1984 | Carmo et al. | ............. 339/91 R |
| 4,815,837 A | 3/1989 | Kikuchi et al. | ............. 359/874 |
| 4,880,393 A | * 11/1989 | Moji | .......................... 439/352 |
| 4,930,370 A | 6/1990 | Yoshida | |
| 4,973,147 A | * 11/1990 | Fujita et al. | ................. 359/877 |
| 5,238,214 A | 8/1993 | Syamoto et al. | |
| 5,294,084 A | 3/1994 | Syamoto et al. | |
| 5,311,368 A | 5/1994 | Tsuyama | |
| 5,376,016 A | 12/1994 | Inaba et al. | |
| 5,724,200 A | * 3/1998 | Mochizuki | ................... 359/877 |
| 5,900,999 A | 5/1999 | Huizenga et al. | ........... 359/877 |
| 6,213,612 B1 | * 4/2001 | Schnell et al. | ............... 359/877 |

FOREIGN PATENT DOCUMENTS

| | | |
|---|---|---|
| GB | 1391523 | 4/1975 |
| GB | 2297072 B | 4/1997 |

* cited by examiner

Primary Examiner—Mark A. Robinson
(74) Attorney, Agent, or Firm—Van Dyke, Gardner, Linn & Burkhart, LLP

(57) ABSTRACT

A vehicle exterior mirror assembly includes an actuator having a case and at least two electric motors supported by a case and connected with the reflective element to provide adjustment to the reflective element with respect to at least two axes. A wiring harness is provided having a connector and a plurality of wires terminated at the connector. The connector includes at least three electrical connector terminals electrically interconnected with the wires. When the connector joins with the actuator case, the connector terminals make direct contact with corresponding receiving terminals of the electric motors. The connector preferably includes a body that is made up of two body portions that are integrally molded defining a living hinge and then folded into facing relationship thereby capturing a portion of each terminal. Complimentary retention members on the connector and actuator case retain the connector with the actuator case external of the case. The connector has a cross-section width sufficiently small to pass through the internal passage of a pivot post.

48 Claims, 6 Drawing Sheets

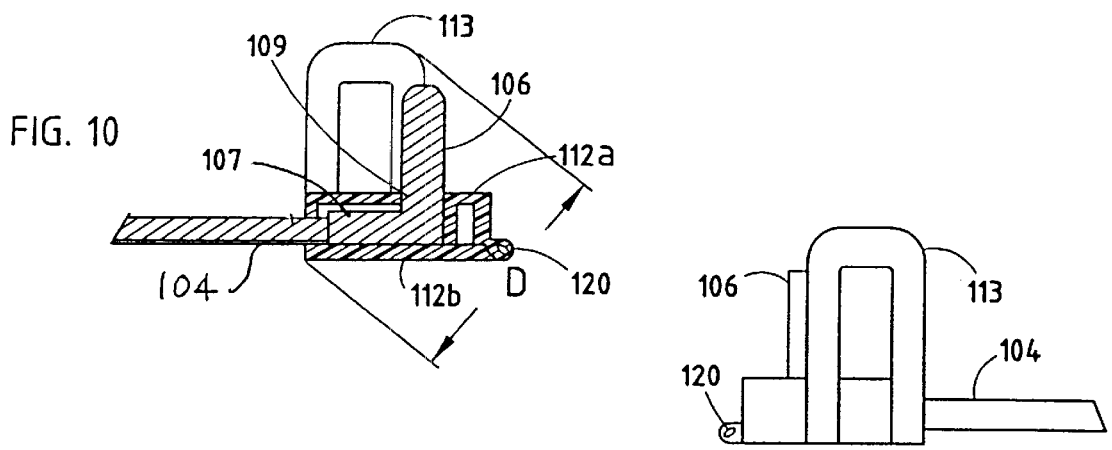
FIG. 10
FIG. 11
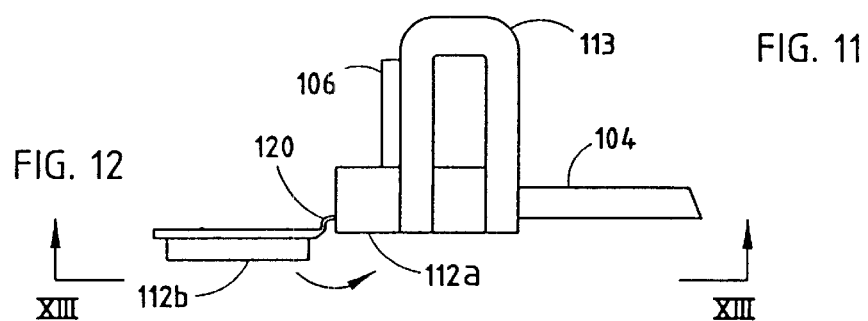
FIG. 12
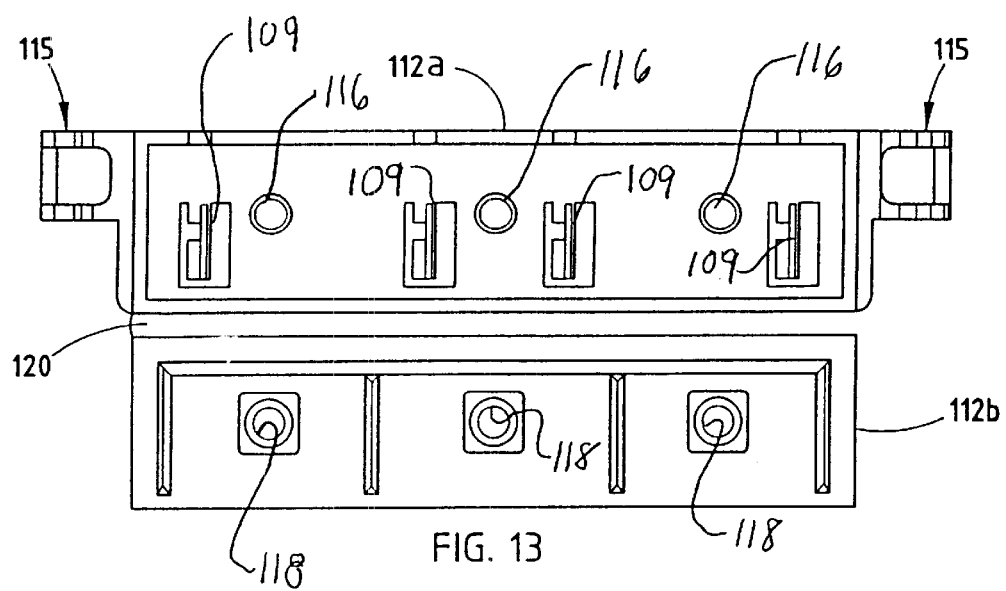
FIG. 13

MIRROR ACTUATOR ELECTRICAL CONNECTOR

This application is a continuation application of application Ser. No. 09/228,348, filed Jan. 11, 1999, now U.S. Pat. No. 6,213,612 which is incorporated by reference in its entirety herein.

BACKGROUND OF THE INVENTION

The present invention is related to a vehicular exterior mirror assembly and, in particular, to an electrical connector arrangement for delivering electrical current to mirror positioning actuator motors in such exterior mirror assembly.

Vehicle exterior mirrors are remotely positionable by an actuator assembly. Such actuator assembly typically includes two motors, each for rotating the mirror with respect to one of two generally orthogonal axes. Various techniques have been proposed for supplying electrical current to the two motors in order to independently actuate the motors in either a forward or reverse rotational direction. It is common to provide a hollow pivot post that pivotally mounts the mirror assembly to the vehicle, in order to provide a breakaway feature whereby the mirrors may be knocked out of position without damaging the mirror mounting or which may be folded by yet another motor into a foldaway position. It is known to have a wiring harness pass through the central opening of the pivot post and be terminated at one or more electrical connectors for connecting with the actuator assembly. A difficulty with the prior art is that the connector bodies used to electrically interface the wiring harness with the actuator case terminals have been too large to pass through the opening in the pivot post pivotally mounting the mirror assembly. Therefore, it has been necessary to leave the other end of the wire harness not terminated to thereby pass -through the opening in the pivot post. This requires a subsequent step of terminating the other end of the wiring harness which is a labor intensive operation that must take place after the mirror has been assembled. On mirror assemblies that are not foldable, it is still necessary to pass the wires through an opening passing to the vehicle.

In a proposed actuator, the connectors are made up of electrical terminals staked onto the wires and then slidably received within complimentary slots in the connector body. Such arrangement has not been entirely satisfactory. The connector body must be made relatively large in order to provide sufficient rigidity to the terminals held in this manner. Furthermore, the assembly of the terminal to the connector body is relatively labor intensive and conducive to automated assembly. Furthermore, the retention of the terminals in the connector body is of questionable strength.

In order to retain the connector to the case of the actuator, resilient clips are provided on the connector body which engage openings in the actuator case. Thus, a force pushing the connector body towards the actuator case will cause the terminals of the connector to engage terminals of the case and will ultimately cause an engagement of the spring resilient clips with the openings in the actuator case. While such arrangement is intended to hold the connector in place against the actuator case, the connector can be readily dislocated by a pulling on the wire harness. Therefore, an extra stay is provided to hold the wiring harness against the actuator case to reduce the likelihood that the wires will be pulled sufficiently to dislocate the connector bodies from the case.

Another difficulty with such arrangement is that it necessitates the placement of openings in the actuator case. Because the actuator is exposed to environmental conditions, namely moisture, road splash, and the like, the existence of openings in the case provides a quality difficulty with the known connector engagement mechanism. In order to overcome the difficulty, the prior art has proposed configuring the connector to provide a sealing interface is between the connector body and the case. While such arrangement may reduce the amount of moisture entering the case, it cannot entirely preclude such penetration.

Another difficulty with prior actuator assemblies is the necessity to provide electrical conductors from terminals on the actuator case to the electrical motors therein. It is common to use metal banding to attach the internal conductors to the external terminals which technique is prone to a high incident of poor conductivity and even mechanical failure. Several proposals have been made to replace the banding procedures of the prior art. One proposal is disclosed in commonly assigned patent application Ser. No. 08/780,996 filed Jan. 9, 1997, for a HOUSING WITH INTEGRAL CONNECTOR FOR REARVIEW MIRROR ACTUATOR ASSEMBLY, the disclosure of which is incorporated herein by reference. However, even the proposals provided therein require a separate step of applying conductors to the actuator case.

SUMMARY OF THE INVENTION

The present invention provides a vehicular exterior mirror assembly which eliminates the drawbacks of the prior art. According to an aspect of the invention, the mirror assembly includes an actuator having a case and at least two electric motors supported by the case and connected with a reflective element to provide adjustment to the reflective element with respect to at least two axes. A wiring harness is provided having a connector and a plurality of wires terminated at the connector. The connector includes at least three electrical connector terminals electrically interconnected with the wires. When the connectors join with the actuator-case, the connector terminals make direct contact with corresponding receiving terminals of the electrical motors. In this manner, the necessity for electrical connectors within the actuator casing is substantially eliminated and both motors are supplied from one connector. Importantly, this eliminates the necessity for the banding of conductors to the motor terminals and the attendant labor expenses and failure mode associated therewith. It also avoids potential misconnection resulting from use of more than one connector to feed the motors.

According to another aspect of the invention, a vehicular exterior mirror assembly includes an actuator having a case and at least two electric motors supported by the case and connected with a reflective element to provide adjustment to the reflective element with respect to two axes. A wiring harness is provided having a connector and a plurality of wires terminated at the connector. The connector includes a plurality of electrical connector terminals electrically interconnected with the wires and adapted to be joined with the actuator case. The connector includes a body defined by two facing portions that capture portions of the connector terminals between the two facing portions. This configuration provides exceptionally secure mechanical support for the terminals by the connector body. This is accomplished in a manner which is easy to assemble and is adapted to automatic assembling techniques. In particular, the connector terminals may be supported by application from above one of the facing portions with the other facing portion then being placed above the connector terminals thereby holding the terminals in place. Preferably, the two portions are integrally molded and define a living hinge. The portions may be joined in facing relationship by known techniques, such as cold staking, heat staking, snap welding, sonic welding and adhesive bonding.

According to another aspect of the invention, a vehicular exterior mirror assembly includes an actuator having a case and at least two electric motors supported by the case and connected with a reflective element to provide adjustment to the reflective element with respect to the two axes. A wiring harness is provided having a connector and a plurality of wires terminated at the connector. The connector includes a plurality of electrical connector terminals electrically interconnected with the wires and adapted to be joined with the actuator case. Complimentary retention members on the connector and the actuator case engage to retain the connector with the actuator case. The retention members are positively engaged, thus requiring motion other than a separating motion between the connector and the actuator case to disengage the retention members. This provides an exceptionally strong mechanical bond between the connector and the actuator case. Preferably, the retention member includes a pair of ears on one of the connector and the actuator case which engage features protruding from the other of the connector and the actuator case.

Accordingly to yet another aspect of the invention, a vehicular exterior mirror assembly includes an actuator having a case and at least two electrical motors supported by the case and connected with a reflective element to provide adjustment to the reflective element with respect to at least two axes. The assembly further includes a wiring harness having a connector and a plurality of wires terminated at the connector. The connector includes a plurality of electrical connector terminals electrically interconnected with the wires and adapted to be joined with the actuator case. The mirror assembly housing defines an internal passage therethrough. The electrical connector has a cross-section width dimension that is less than the cross section of the internal passage of the mirror assembly housing. This allows the connector to be passed through the opening during assembly of the mirror assembly. In this manner, both ends of the wiring harness can be terminated in electrical connectors prior to assembly to the mirror assembly and the connector which joins with the actuator case can be passed through the opening in order to interconnect the actuator with the vehicle electrical system. This is exceptionally efficient in assembly of the mirror assembly. By allowing both ends of the wiring harness to be terminated in connectors ahead of time, the wiring harness is adapted to be manufactured using automated techniques.

These and other objects, advantages, and features of this invention will become apparent upon review of the following specification in conjunction with the drawings.

BRIEF DESCRIPTION OF THE DRAWINGS

FIG. 10 is a sectional view taken along the lines X—X in FIG. 8;

FIG. 11 is an end elevation taken along the lines XI—XI in FIG. 8;

FIG. 12 is the same view as FIG. 11 illustrating the portions of the connector in their unassembled position for receiving electrical terminals therein; and FIG. 13 is a view taken along the lines XIII—XIII in FIG. 12.

DESCRIPTION OF THE PREFERRED EMBODIMENT

Figure 1:
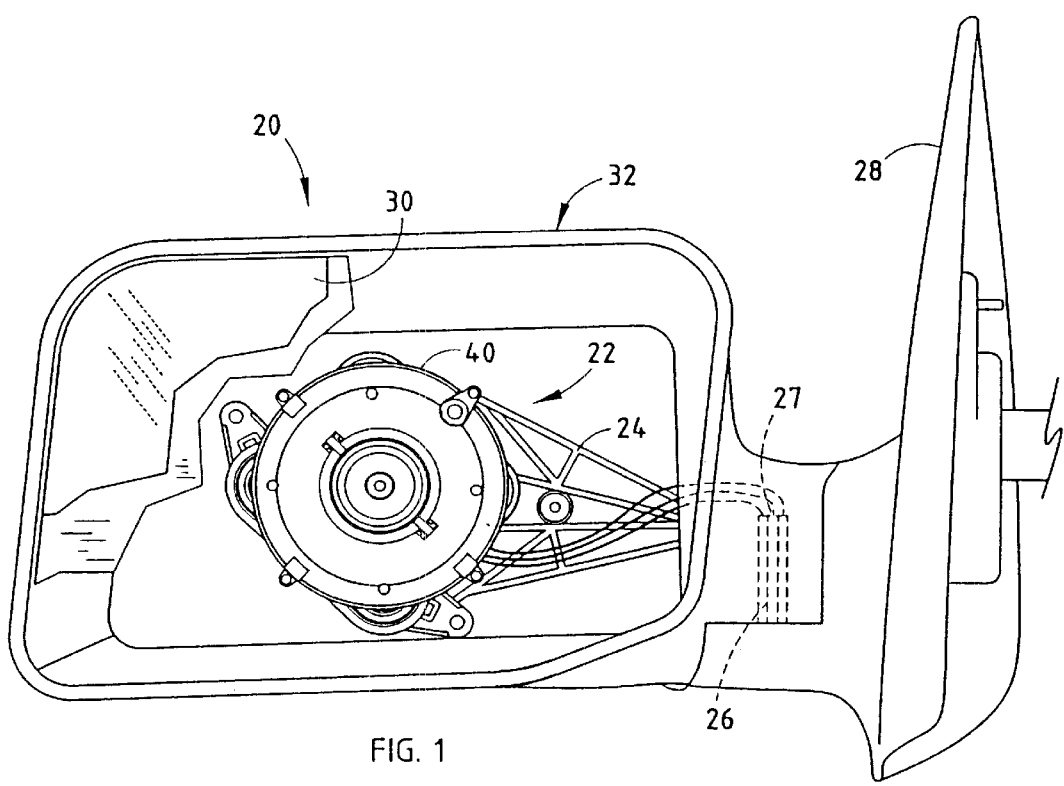
FIG. 1 is a rear elevation looking forward with respect to the vehicle, of an exterior mirror assembly according to the invention, with a portion of the reflective element removed to reveal internal features thereof.

Referring now specifically to the drawings, and the illustrative embodiments depicted therein, a vehicular exterior mirror assembly 20 includes an actuator 22, which is mounted by a bracket 24 through a pivot post 26 to a portion 28 of a vehicle (FIG. 1). A mirror reflective element 30 is supported by actuator 22 in a manner that provides adjustability to the plane of the mirror element about two axes which are generally aligned with earth's vertical and horizontal axes (not shown). Mirror element 30 may be an electro-optic mirror element capable of a partial reflectance level such as an electrochromic mirror element or may be a non-electro-optic mirror element, such as a chrome mirror or the like. Pivot post 26 provides a breakaway feature of mirror assembly 20 such that engagement with a fixed or moveable object will tend to result in folding of the mirror forwardly and rearwardly rather than destruction of the mirror. However, pivot post 26 could also provide a foldaway feature to mirror assembly 20 such that the mirror assembly can be folded close to the vehicle body by a motor (not shown) in response to actuation by an actuator as is known in the art. A housing 32 generally surrounds actuator 22 and bracket 24 and is also attached to pivot post 26 or to bracket 24. Pivot post 26 is hollow including a throughopening 27 through its pivot axis.

Figure 2:
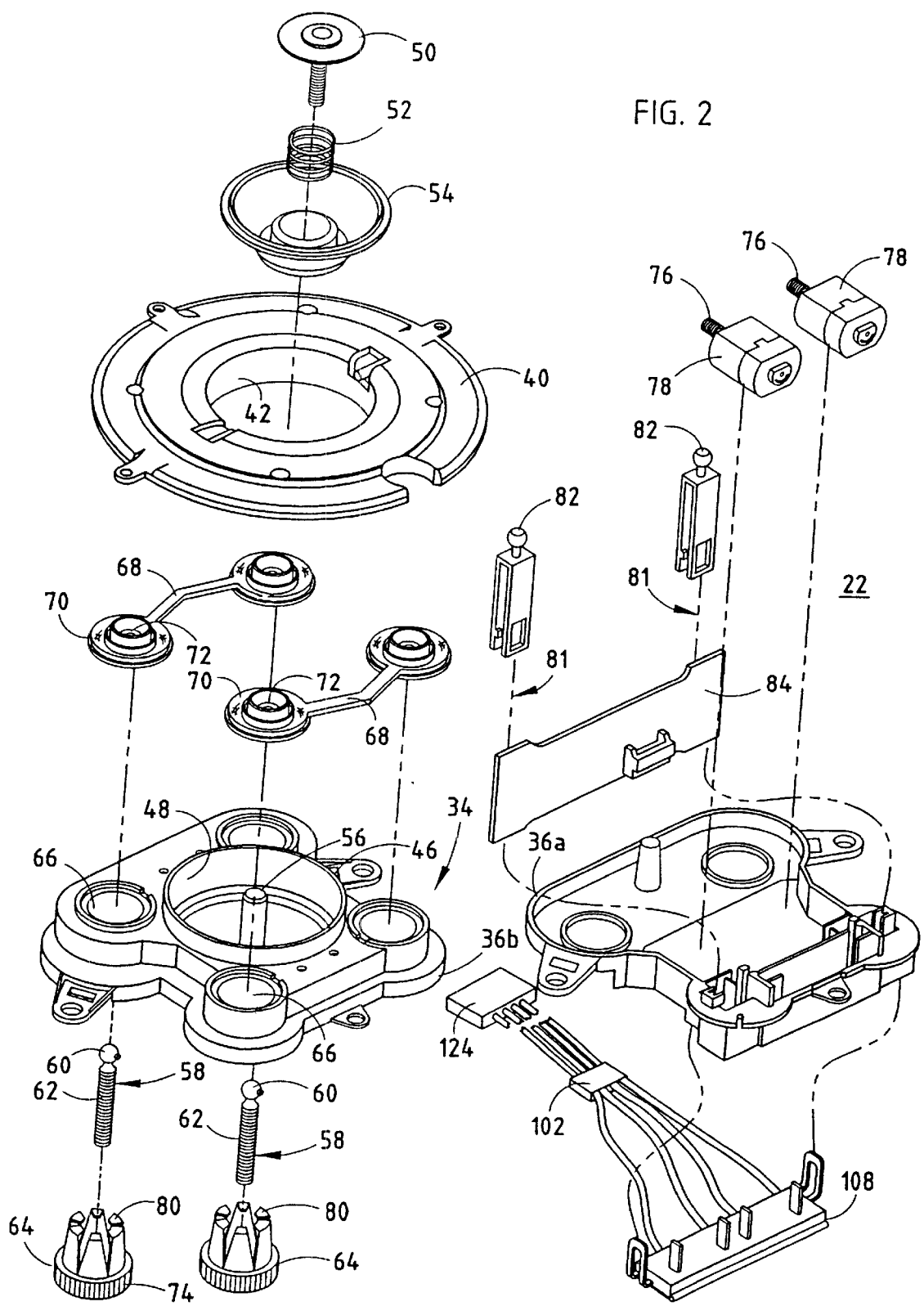
FIG. 2 exploded perspective view of an actuator and wiring harness according to the invention FIG. 3 bottom plan view of an actuator illustrating features of the case which are engageable with a wiring harness according to the invention.

Actuator 22 includes a case 34 made up of complimentary case portions 36a and 36b (FIG. 2). A mirror mounting flange 40 is pivotally positionable with respect to case 34 in a manner which is described in copending application Ser. No. 09/047,846 filed Mar. 25, 1998, by Robert E. Schnell for a PIVOT SUPPORT FOR ADJUSTABLE REARVIEW MIRROR, now U.S. Pat. No. 6,168,279, the disclosure of which is hereby incorporated herein by reference. Suffice it to say, mounting flange 40 includes an outer conical surface (not shown) on a portion 42 which is in slidable contact with an edge 46 defined by a generally cylindrical wall 48 of case portion 36b. Mirror mounting flange 40 is biased into moveable engagement with case 34 by a fastener 50 and spring biasing member 52 which biases a retention cup 54 in the direction of case 34 by engagement with a post 56 extending from case portion 36b.

Mirror mounting flange 40 is rotated independently about two generally orthogonal axes by a pair of screw jacks 58. Each screwjack has a ball 60 which is received within a socket (not shown) of mirror mounting flange 40 and a threaded shaft 62 which threadably engages an internal thread 80 of a rotatable nut member 64. An opening 66 through which screw jack 58 extends is sealed by a gasket member 68 having a seal 70 overlying opening 66. Each seal 70, in turn, has an opening 72 through which ball 60 can protrude. Each nut member 64 includes an external ring 74 having gear teeth formed thereon which is rotatably engaged with a worm gear 76 of an electric DC motor 78. In this manner, rotation of worm gear 76 by motor 78 rotates nut member 64 which extends or retracts screw jack 58 by threadable engagement between threaded shaft 62 and internal threads 80 on nut member 64. Although the above is a preferred mechanism for pivotably positioning the mirror mounting flange with respect to the case, other mechanisms known in the art may also be used.

If mirror assembly 20 is a memory mirror which is capable of being repositioned to positions stored in a memory device, as is known in the art, actuator 22 may additionally include a pair of linear position transducers 81. In the illustrated embodiment, transducers 81 are made up of an actuator 82 which slidably engages a set of carbon traces (not shown) on a circuit board 84 mounted to case portion 36*a*. In this manner, as each motor 78 positions mirror mounting flange 40 about its associated axis, the position of the mirror-mounting flange with respect to that axis is monitored by the corresponding linear position transducer 81. The details of linear transducers 81 are disclosed in detail in application Ser. No. 09/228,579, filed concurrently with the present application by David Willmore and Robert Schnell for a VEHICLE MEMORY MIRROR POSITION TRANSDUCER, now U.S. Pat. No. 6,094,027, the disclosure of which is hereby incorporated herein by reference. However, other forms of position transducers known in the art may be used if a memory mirror function is desired. Movable components of actuator 22 may be lubricated with a suitable lubricant, such as a synthetic hydrocarbon with lithium soap marketed by NYE Lubricants under Model No. Rheolube 361, or the like.

Motors 78 each include a pair of female terminals 86 which supply electrical energy to operate motors 78 (FIGS. 4–7). In the illustrated embodiment, terminals 86 are recessed female terminals but could, alternatively, be male terminals protruding from the housing of motors 78. Housing portion 36*a* has an outer surface 88 which defines a connector-engaging portion 90. A series of openings 92 are formed in connector-engaging portion 90. Openings 92 are generally aligned with terminals 86 such that a male terminal inserted in an opening 92 will engage a corresponding female terminal 86. Connector-engaging portion 90 has a pair of side portions 94*a* and 94*b*, each of which extends generally at right angles to connector-engaging portion 90 of outer surface 88. A pair of retention members 96*a*, 96*b* protrude from respective side portions 94*a*, 94*b*. Each retention member includes a camming surface 98*a*, 98*b* and a retention surface 100*a*, 100*b*.

Mirror assembly 20 further includes a wire harness 102 which is made up of a plurality of wires 104, each of which is electrically and mechanically joined with an electrical terminal 106 of a connector assembly 108. Connector assembly 108 includes a body 110 made up of two facing body portions 112*a*, 112*b*. Body portion 112*a* includes a plurality of recesses 114 which are configured to conform to a base portion 107 of terminal 106. Each recess is juxtaposed with an opening 109 that penetrates body portion 112 such that the terminal 106 may extend from the connector body. Each terminal base portion 107 is inserted into one of the recesses 109 and retained therein when the body portion 112*b* is joined with body portion 112*a*. This is accomplished by joining the body portions by known relationships, such as cold staking, heat staking, snap welding, sonic welding, adhesive bonding, or the like. To assist in the bonding, one or more posts 116 extend from either body portion 112*a* or 112*b* and are tightly received in a corresponding opening 118 in the opposite body portion 112*a*, 112*b*. Post 118 provides an additional surface area for use in joining the connector portions together and may be deformed during the joining process to further retain the body portions together. As can be seen by reference to FIG. 9, because each contact base portion 107 is captured between body portion 112*a* and 112*b*, the terminal is resistant to being pulled out of its mooring in the connector. Advantageously, body portions 112*a* and 112*b* may be formed together in a single piece by a living hinge including a hinge portion 120 such that, prior to assembly, the body portions 112*a* and 112*b* are generally coplanar, as illustrated in FIGS. 12 and 13, and, after assembly, the body portions are in facing relationship, as illustrated in FIGS. 8–11. In the illustrated embodiment, body 110 is made from polyester plastic but other known plastics may be used.

A pair of retention members 115, shown as ears, extend from body portion 108 and engage with respective retention members 96*a* and 96*b* on case portion 36*a*. Each retention member 115 has an outer frame 113 surrounding a central opening 114 therein. The solid frame 113 of retention member 115 slides over respective camming surfaces 98*a*, 98*b* as connector assembly 108 is joined with casing 36. Because retention members 115 are flexible, they expand outward under the action of camming surfaces 98*a*, 98*b* and may be captured by retention surface 100 thereby mechanically retaining the connector in position against casing 36. Retention members 115 may be made resilient so that they snap into alignment with retention surfaces 100. Alternatively, they could be flexible yet require movement into position with retention surfaces 100*a*, 100*b* either by finger motion or by using a tool. However, it is seen that the engagement between retention members 115 and retention members 96*a*, 96*b* provide complimentary retention members which positively retain a connector on the actuator case such that the connector is not prone to being pulled off of the case merely by pulling on wires 104. Instead, a positive disengagement motion on retention members 115 is required in order to remove the connector from the case. The retention members could be configured such that a tool is required to dislodge the ears from the retention member. Alternatively, they could be configured that finger motion is all that is necessary to dislodge the retention members. Either way, the engagement between the connector assembly and the case is secure. It should be apparent that retention members 115 could be positioned on case 34 and retention members 96*a*, 96*b* on connector body 108.

Figure 8:
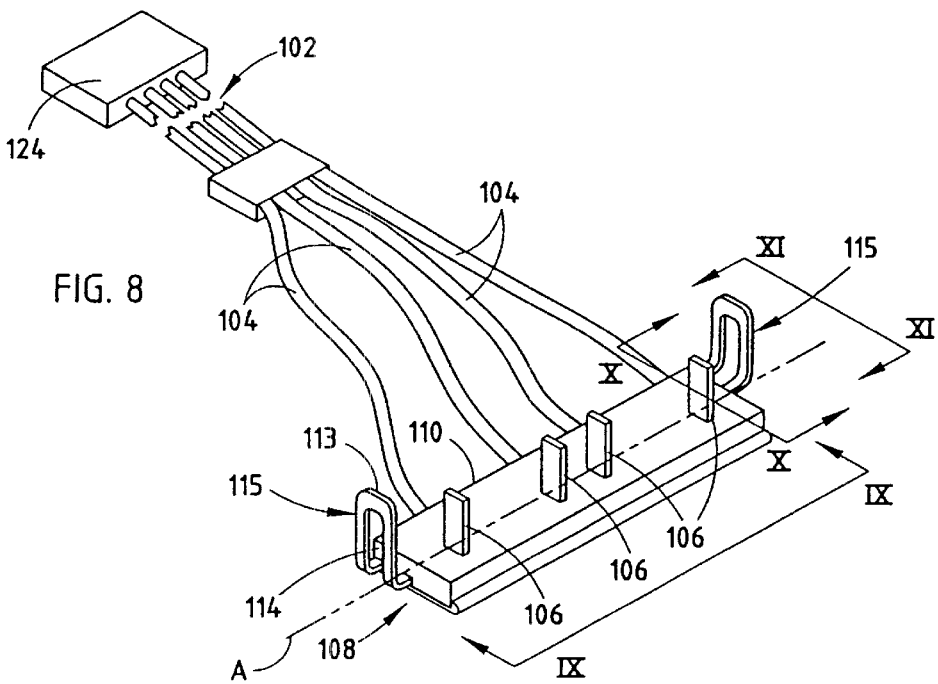
FIG. 8 is a perspective view of a wiring harness according to the invention.
Figure 9:
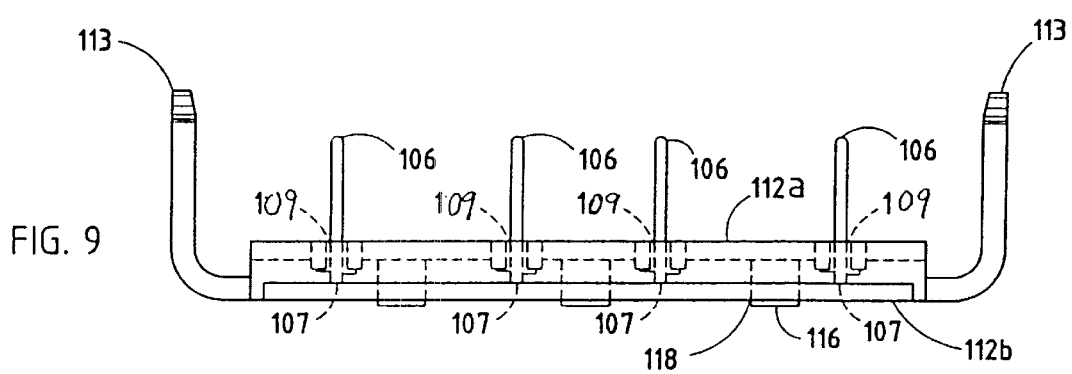
FIG. 9 is a end elevation taken along the lines IX—IX in FIG. 8.

Connector body 108 has a maximum cross-sectional dimension D shown in FIG. 10 that is perpendicular to its long axis A seen in FIG. 8. In this manner, connector assembly 108 can be fit through a circular opening having a diameter at least somewhat greater than the dimension D.

Because of the unique configuration of connector 108, dimension D can be made smaller than cross-section dimensions of central opening 27 through pivot post 26 so that connector assembly 108 can be fit through central opening 27 of pivot post 26. This allows wiring harness 102 to be fully assembled to connector 124 on the opposite ends of wires 104 prior to assembly of the exterior mirror assembly. This advantageously allows the wiring harness to be inserted in position extending from vehicle portion 28 to actuator 22 through pivot post 26 after both ends of wiring harness 102 are terminated with connectors. This is advantageous during assembly of the vehicle exterior mirror assembly because wiring harness 102 may be assembled to the mirror assembly after it has been assembled merely by the insertion of connector assembly 108 through the opening in pivot post 26 without the need for subsequent termination of individual wires 104.

Connector assembly 108 has, preferably, four terminals for individually connecting to both motors 78. Two of the terminals can, if desired, be fed by a common ground or power lead. Alternatively, connector 108 could have three terminals for connecting with both motors 78, one of the terminals being a common ground or a common power lead to both motors. Advantageously, this simultaneous connection to both motors 78 reduces the number of connections that must be made during assembly of the vehicle and reduces the ability to misconnect the wiring harness to the actuator. Advantageously, connector assembly 108 is retained to case 36 by retention members that do not penetrate the case. Because every opening into the case is a potential source of moisture leakage, this feature enhances the moisture resistance of the actuator case. Because terminals 106 connect directly with terminals on the motor, the need for an internal wiring harness in case 36 is eliminated.

Connector assembly 108 securely retains terminals 106 in the connector body by retaining a base 107 of each terminal 106 between opposing housing portions which are fixedly joined together. This greatly enhances the securing of each terminal within the connector. Furthermore, because the terminals are inserted through openings in a connector portion, the connector is adapted to automated assembly techniques.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A vehicular exterior mirror actuator assembly for adjustably positioning a reflective element, said mirror actuator assembly comprising:

an actuator having a case and at least two electric motors supported by said case and adapted to be connected with a reflective element to provide adjustment to the reflective element with respect to at least two axes;

a wire harness having a connector and a plurality of wires terminated at said connector, said connector including at least three electrical connector terminals electrically interconnected with said wires; and said connector joined with said actuator case by at least one retention member, said retention member being captured by said actuator case and positively engaging said actuator case to positively retain said connector joined with said case when said wire harness is pulled, said connector terminals making direct contact with corresponding receiving terminals of said at least two electric motors when said connector is joined with said case, said connector being made up of two body portions joined in facing relationship, wherein said two body portions are integrally molded defining a living hinge.

2. The vehicular exterior mirror actuator assembly according to claim 1, wherein said retention member engages an exterior portion of said actuator case whereby said retention member does not penetrate said actuator case.

3. The vehicular exterior mirror actuator assembly according to claim 2, wherein said at least one retention member comprises a pair of retention members, said connector being joined with said actuator case by said pair of said retention members, said pair of retention members positively engaging said actuator case to positively retain said connector joined with said case when said wire harness is pulled, and said pair of retention members engaging an outer surface of said actuator case whereby said pair of retention members do not penetrate said actuator case.

4. The vehicular exterior mirror actuator assembly according to claim 3, wherein said actuator case includes opposed side walls, said pair of retention members engaging said opposed side walls of said actuator case.

5. The vehicular exterior mirror actuator assembly according to claim 3, wherein said actuator case includes a pair of retention members, said retention members of said actuator case each including a retention surface, said retention members of said connector having engagement surfaces engaging said retention surfaces of said retention members of said actuator case to thereby positively engage said connector with said actuator case.

6. The vehicular exterior mirror actuator assembly according to claim 5, wherein said connector mounts to said actuator case in a joining direction, said retention surfaces being substantially orthogonal to said joining direction.

7. The vehicular exterior mirror actuator assembly according to claim 5, wherein each of said retention members of said actuator case includes a camming surface, said camming surfaces urging said retention members of said connector to expand outwardly from an initial orientation when said connector is initially mounted onto said actuator case, said retention members of said connector thereafter substantially returning to their initial orientation.

8. The vehicular exterior mirror actuator assembly according to claim 5, wherein said retention members of said actuator case are formed on opposed side walls of said actuator case.

9. The vehicular exterior mirror actuator assembly according to claim 2, wherein said two body portions joined capture said plurality of wires terminated at said connector therebetween.

10. The mirror actuator assembly according to claim 2, wherein said retention member is configured to be engaged by a tool for disengagement of said connector from said actuator case.

11. The mirror actuator assembly according to claim 1, wherein said two body portions are joined in facing relationship by at least one of cold staking, heat staking, snap welding, sonic welding, and adhesive bonding.

12. The mirror actuator assembly according to claim 11, wherein said connector terminals include at least one base portion captured between said two body portions.

13. The mirror actuator assembly according to claim 11, further comprising a mirror assembly pivot post defining an internal passage having a cross-section dimension therethrough, wherein said electrical connector has a cross-section width dimension which is less than the cross-section of said internal passage of said mirror assembly pivot post whereby said electrical connector can be passed through said internal passage of said mirror assembly pivot post.

14. The mirror actuator assembly according to claim 1, wherein said retention members of said actuator case are provided on opposed sides of said actuator case.

15. The mirror actuator assembly according to claim 1, wherein said reflective element comprises electrochromic mirror element.

16. A vehicular exterior mirror actuator assembly for adjustably positioning a reflective element, said mirror actuator assembly comprising:

an actuator having a case and at least two electric motors supported by said case and adapted to be connected with a reflective element to provide adjustment to the reflective element with respect to at least two axes;

a wire harness having a connector and a plurality of wires terminated at said connector, said connector including at least three electrical connector terminals electrically interconnected with said wires;

said connector joined with said actuator case by at least one retention member, said retention member being captured by said actuator case and positively engaging said actuator case to positively retain said connector joined with said case when said wire harness is pulled, and said connector terminals making direct contact with corresponding receiving terminals of said at least two electric motors when said connector is joined with said case; and a member defining an internal passage having a cross-section dimension and wherein said electrical connector has a cross-section width dimension that is less than said cross-section dimension of said internal passage.

17. The mirror actuator assembly in claim 16 wherein said connector is made up of two body portions joined in facing relationship.

18. The mirror actuator assembly in claim 17 wherein said body portions are joined in facing relationship by one of cold staking, heat staking, snap welding, sonic welding and adhesive bonding.

19. The mirror actuator assembly in claim 17 wherein said connector terminals include base portions which are captured between said two body portions.

20. The mirror actuator assembly in claim 16 including complementary retention members on said connector and said actuator case that engage to retain said connector with said actuator case.

21. The mirror actuator assembly in claim 20 wherein said retention members are external of said actuator case.

22. The mirror actuator assembly in claim 20 wherein said retention members are positively engaged thereby requiring motion other than a separating force between said connector and said actuator case to disengage said retention members.

23. The mirror actuator assembly in claim 22 wherein said retention members include a pair of ears on one of said connector and said actuator case which engage features protruding from a surface of the other of said connector and said actuator case.

24. The mirror actuator assembly in claim 22 wherein said retention members are configured to require a tool to be disengaged.

25. The mirror actuator assembly in claim 16 wherein said reflective element is an electrochromic mirror element.

26. The mirror actuator assembly in claim 16 wherein said mirror assembly is a memory mirror assembly and further includes a reflective element position transducer in said case for each said axis.

27. A vehicular exterior mirror actuator assembly for adjustably positioning a reflective element, comprising:

an actuator having an actuator case and at least two electric motors supported by said case and adapted to be connected with a reflective element to provide adjustment to the reflective element with respect to at least two axes;

a wire harness having a connector and a plurality of wires terminated at said connector, said connector including a plurality of electrical connector terminals electrically interconnected with said wires and adapted to be joined with said actuator case;

complementary retention members on said connector and said actuator case that engage each other are captured thereby to securely join said connector with said actuator case, the retention members retaining said connector joined with said case when said wire harness is pulled thereby requiring motion other than a separating motion between said connector and said actuator case to disengage said retention members; and a mirror assembly pivot post defining an internal passage having a cross-section dimension therethrough and wherein said electrical connector has cross-section width dimensions which are less than the cross section of said internal passage of said mirror assembly pivot post.

28. The mirror actuator assembly in claim 27 wherein said retention members are external of said actuator case.

29. The mirror actuator assembly in claim 27 wherein said retention members are configured to be disengaged by a tool.

30. The mirror actuator assembly in claim 27 wherein said reflective element is an electrochromic mirror element.

31. The mirror actuator assembly in claim 29 wherein said retention members include a pair of ears on one of said connector and said actuator case which engage features protruding from a surface of the other of said connector and said actuator case.

32. The mirror actuator assembly in claim 27 wherein said mirror assembly is a memory mirror assembly and further includes a reflective element position transducer in said case for each said axis.

33. The mirror actuator assembly according to claim 27, wherein said retention members of said actuator case are provided at opposed sides of said case.

34. The mirror actuator assembly according to claim 27, wherein said mirror assembly comprises a memory mirror assembly and further includes a reflective element position transducer in said case for at least one axis.

35. The mirror actuator assembly according to claim 27, wherein said connector comprises a body formed from at least two portions, said two portions joined in a facing relationship and carrying said plurality of wires terminated at said connector therebetween.

36. The mirror actuator assembly according to claim 35, wherein said two portions are joined by a hinge.

37. A vehicular exterior mirror actuator assembly for adjustably positioning a reflective element, said vehicular exterior mirror actuator assembly comprising:

an actuator having an actuator case and at least one electric motor, said actuator being adapted to provide adjustment to a reflective element;

a wire harness having a connector and a plurality of wires terminated at said connector, said connector including a plurality of electrical connector terminals electrically interconnected with said wires; and said connector joined with said actuator case by a pair of retention members, said retention members positively engaging said actuator case to positively retain said connector joined with said case by said retention members when said wire harness is pulled, said connector terminals making direct contact with corresponding receiving terminals of said electric motor when said connector is joined with said case, said pair of retention members engaging an outer surface of said actuator case whereby said pair of retention members do not penetrate said actuator case, said actuator case including a pair of retention members, said retention members of said actuator case each including a retention surface, said retention members of said connector having engagement surfaces engaging said retention surfaces of said retention members of said actuator case to thereby positively engage said connector with said actuator case, said retention members of said actuator case being formed on opposed side walls of said actuator case, and wherein said connector comprises a connector body formed from two portions, said two portions being joined by a hinge.

38. The vehicular exterior mirror actuator assembly according to claim 37, wherein said hinge comprises a living hinge.

39. The vehicular exterior mirror actuator assembly according to claim 37, wherein said connector mounts to said actuator case in a joining direction, said retention surfaces being substantially orthogonal to said joining direction.

40. The vehicular exterior mirror actuator assembly according to claim 37, wherein said actuator case includes opposed sidewalls, said pair of retention members engaging said opposed side walls of said actuator case.

41. The mirror actuator assembly according to claim 37, wherein said connector comprises a body formed from two portions, said two portions joined in a facing relationship and carrying said plurality of wires terminated at said connector therebetween.

42. The mirror actuator assembly according to claim 41, wherein said two portions are joined by a hinge.

43. A vehicular exterior mirror actuator assembly for adjustably positioning a reflective element, said mirror actuator assembly comprising:

an actuator having an actuator case and at least one motor supported in said actuator case, said actuator being adapted to provide adjustment to a reflective element; and a wire harness having a connector and a plurality of wires terminated at said connector, said connector being formed from two portions joined in a facing relationship and joined by a hinge and including a plurality of electrical connector terminals electrically interconnected with said wires, said connector joined with said actuator case by at least two retention members, said retention members positively engaging said actuator case to positively retain said connector joined with said case when said wire harness is pulled, said connector terminals making direct contact with corresponding receiving terminals of said motor when said connector is joined with said case, said retention members being spaced outwardly from said connector terminals, and said retention members straddling said actuator case and engaging opposed side walls of said actuator case.

44. The vehicular exterior mirror actuator assembly according to claim 43, wherein said actuator case includes retention members at said side walls, said retention members of said actuator case being engaged by said retention members of said connector.

45. The vehicular exterior mirror actuator assembly according to 44, wherein each of said retention members of said connector comprises a generally U-shaped frame.

46. The vehicular exterior mirror actuator assembly according to claim 45, wherein each of said retention members of said actuator case includes a camming surface and a retaining surface, said camming surfaces initially urging said retention members of said connector outwardly when said connector is mounted to said actuator case.

47. The vehicular exterior mirror actuator assembly according to claim 43, wherein said connector mounts to said actuator case in a mounting direction, said retention members of said connector including engagement surfaces for engaging said actuator case, and said engagement surfaces being substantially orthogonal to said mounting direction to thereby positively retain said connector joined with said actuator case when said wire harness is pulled.

48. The mirror actuator assembly according to claim 43, wherein said retention members are configured to be engaged by a tool for disengagement of said connector from said actuator case.

* * * * *

UNITED STATES PATENT AND TRADEMARK OFFICE
CERTIFICATE OF CORRECTION

PATENT NO. : 6,467,920 B2  
APPLICATION NO. : 09/812434  
DATED : October 22, 2002  
INVENTOR(S) : Robert E. Schnell and David K. Willmore It is certified that error appears in the above-identified patent and that said Letters Patent is hereby corrected as shown below:

Column 2:  
Line 6, Delete "is".  
Line 38, "actuator-case" should be --actuator case--.

Figure 3:
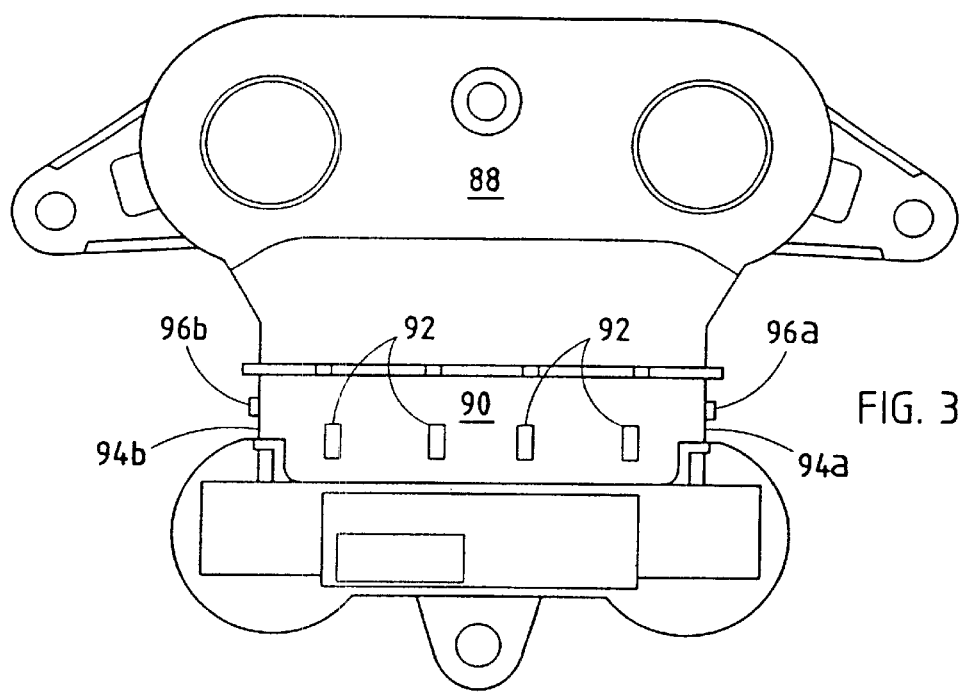
Figure 4:
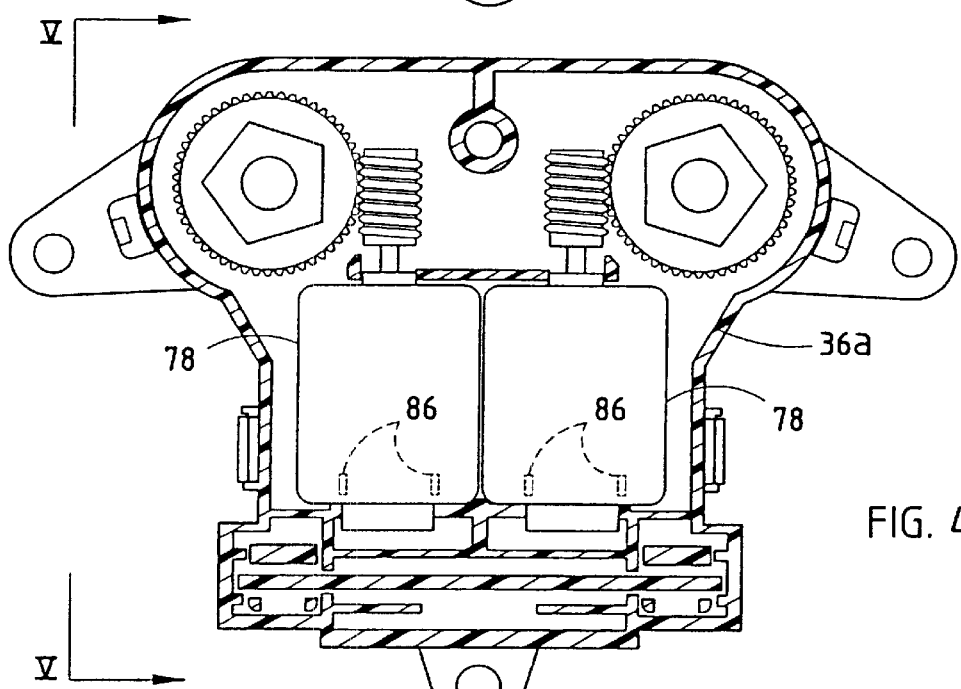
FIG. 4 is a top plan view of an actuator with a portion of the case removed to reveal internal feature thereof.
Figure 5:
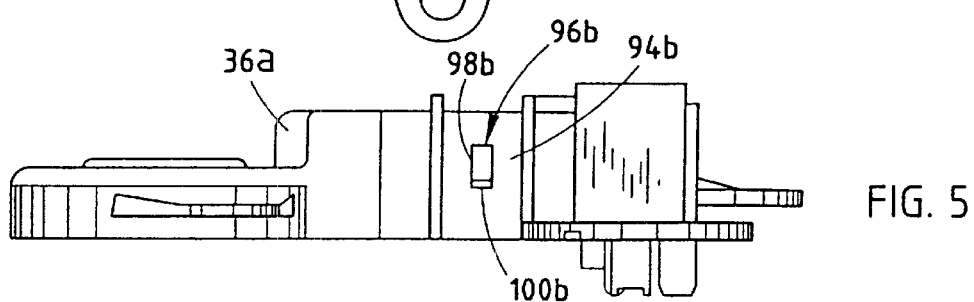
FIG. 5 is a side elevation taken along the lines V—V in FIG. 4.
Figure 6:
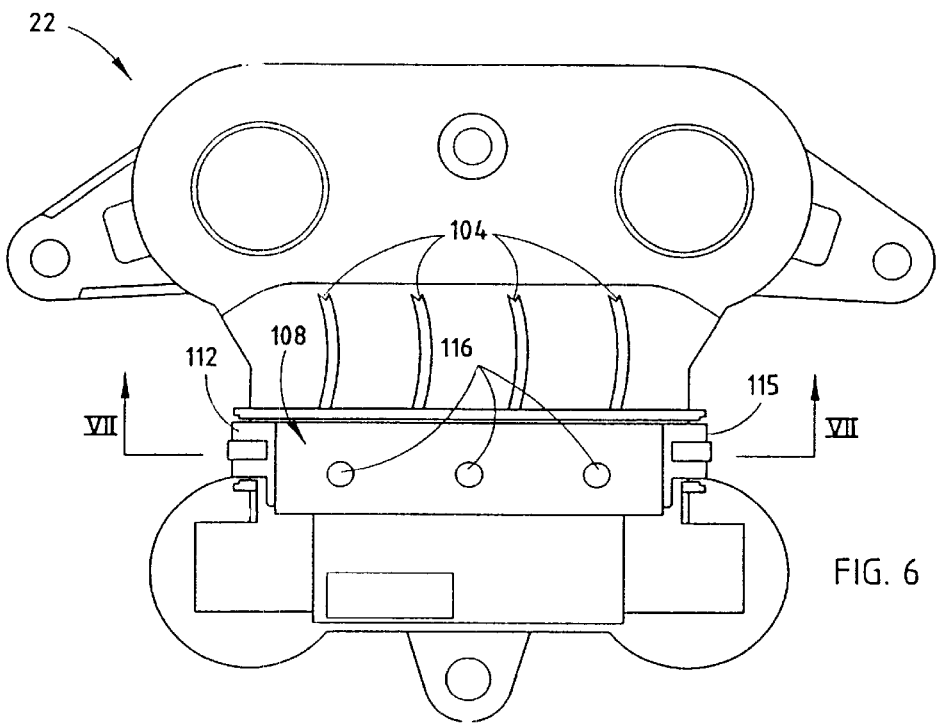
FIG 6. is the same view as FIG. 3 with a wiring harness and connector attached to the actuator case.
Figure 7:
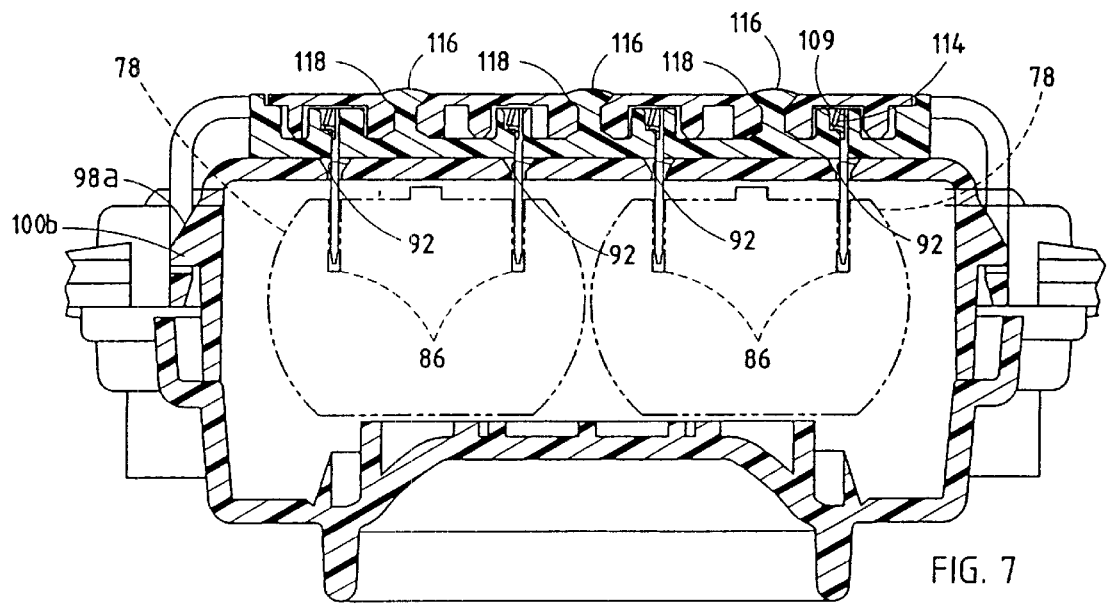
FIG. 7 is a sectional view taken along the lines VII—VII in FIG. 6.

Column 3:  
Line 59, Insert --is an-- after "Fig. 2".  
Line 61, Insert --is a-- after "Fig. 3".  
Line 65, "feature" should be --features--.

Column 4:  
Line 7, "a" should be --an--.  
Line 65, "screwjack" should be --screw jack--.

Column 12:  
Line 20, Claim 45, Insert --claim-- before "44".

Signed and Sealed this

Seventeenth Day of July, 2007

JON W. DUDAS  
*Director of the United States Patent and Trademark Office*